US008025926B2

(12) United States Patent
O'Brien et al.

(10) Patent No.: US 8,025,926 B2
(45) Date of Patent: Sep. 27, 2011

(54) VARNISH COMPOSITIONS FOR ELECTRICAL INSULATION AND METHOD OF USING THE SAME

(75) Inventors: Michael J. O'Brien, Clifton Park, NY (US); Patricia Chapman Irwin, Altamont, NY (US); Qiwei Lu, Seven Hills, OH (US)

(73) Assignee: Sabic Innovative Plastics IP B.V. (NL)

( * ) Notice: Subject to any disclaimer, the term of this patent is extended or adjusted under 35 U.S.C. 154(b) by 382 days.

(21) Appl. No.: 12/241,285

(22) Filed: Sep. 30, 2008

(65) Prior Publication Data

US 2009/0269488 A1     Oct. 29, 2009

(51) Int. Cl.
    B05D 3/02        (2006.01)
(52) U.S. Cl. ............... 427/385.5; 427/104; 427/384
(58) Field of Classification Search ........... 427/385.5, 427/104, 384
    See application file for complete search history.

(56) References Cited

U.S. PATENT DOCUMENTS

| | | | |
|---|---|---|---|
| 3,306,875 A | 2/1967 | Hay | |
| 3,792,122 A * | 2/1974 | Fromuth | 525/68 |
| 3,835,200 A * | 9/1974 | Lee, Jr. | 524/504 |
| 3,996,307 A * | 12/1976 | Najvar et al. | 525/482 |
| 4,866,126 A * | 9/1989 | Mylonakis et al. | 525/68 |
| 4,923,932 A | 5/1990 | Katayose et al. | |
| 6,521,703 B2 | 2/2003 | Zarnoch et al. | |
| 6,897,282 B2 | 5/2005 | Freshour et al. | |
| 7,329,708 B2 | 2/2008 | Birsak et al. | |
| 2001/0053820 A1 * | 12/2001 | Yeager et al. | 525/186 |
| 2004/0146692 A1 | 7/2004 | Inoue et al. | |
| 2006/0041086 A1 * | 2/2006 | Birsak et al. | 525/391 |
| 2007/0066710 A1 * | 3/2007 | Peters et al. | 523/160 |
| 2007/0078236 A1 * | 4/2007 | Bonnet et al. | 525/529 |

OTHER PUBLICATIONS

JP2003313435A; Nov. 6, 2003; Machine Translation (61 pages).
JP2003292802A; Oct. 15, 2003; Machine Translation (49 pages).
JP19941842134A; Jul. 5, 1994; Machine Translation (28 pages).
Written Opinion of the International Searching Authority; International Application No. PCT/US2009/038163; International Filing Date Mar. 25, 2009; Date of Mailing Nov. 5, 2009 (5 pages).
International Search Report; International Application No. PCT/US2009/038163; International Filing Date Mar. 25, 2009 (5 pages).

* cited by examiner

*Primary Examiner* — Dah-Wei Yuan
*Assistant Examiner* — Robert S Walters, Jr.
(74) *Attorney, Agent, or Firm* — Cantor Colburn LLP

(57) ABSTRACT

A varnish composition for producing an electrically insulative thermoset coating is disclosed. The varnish composition includes a functionalized poly(phenylene ether) having at least one aliphatic unsaturated group and exhibiting an intrinsic viscosity in the range of about 0.06 to about 0.25 deciliter per gram, measured in chloroform at 25° C. The varnish composition further includes an unsaturated polyester resin or vinyl ester resin, a reactive liquid monomer, and a compatibilizing agent. When cured, the polymers and reactive liquid monomer form an electrically insulative thermoset.

21 Claims, No Drawings

VARNISH COMPOSITIONS FOR ELECTRICAL INSULATION AND METHOD OF USING THE SAME

FIELD OF THE INVENTION

The present invention is directed to varnish compositions for insulating electrical machinery and more particularly to poly(phenylene ether)-containing polymeric blends.

BACKGROUND OF THE INVENTION

Although the stator windings of electrical inductive devices, such as motors, are wound with magnet wire having enamel or other insulative coating thereon, it is often desirable to further coat the windings and seal them from the environment. When the motor is used in environments where the stator windings are exposed to moisture or abrasive materials, such as sand and dirt, it is often desirable to further protect the stator windings from the environment by means of an additional coating. For example, protection of the stator windings is desirable in blower motors utilized in the cooling systems for locomotive traction motors. Protection is also desirable in open motors utilized in driving pumps in oil field applications, which are exposed directly to blowing sand and dirt, as well as moisture.

Conventional curable varnish compositions, such as those used in certain locomotive traction motors, are so-called "solventless" varnishes based on unsaturated polyester resin (UPR). These varnish systems, however, have a glass transition temperature ($T_g$) significantly below 80° C. Thus, their performance at motor operating temperatures, usually about 160° C., can result in significant thermal degradation after extended operating times. In addition, such varnishes tend to chip or crack, particularly when subjected to vibrations accompanying locomotive operation. Such UPR varnishes also have a high moisture absorption rate and their ester bonds are hydrolysable, which may result in more frequent maintenance intervals than desired.

What is needed is a varnish composition that can better withstand higher temperature and a method for electrically insulating electrical devices with the varnish composition.

SUMMARY OF THE INVENTION

Disclosed is a composition comprising: a functionalized poly(phenylene ether) having at least one aliphatic unsaturated group and exhibiting an intrinsic viscosity in the range of about 0.06 deciliter per gram to about 0.25 deciliter per gram, measured in chloroform at 25° C., an unsaturated polyester resin or vinyl ester resin, a reactive liquid monomer, and a compatibilizing agent.

Also disclosed is a method for electrically insulating a motor using a varnish composition comprising providing a component of a motor, applying a varnish composition as described above to the motor component, and curing the varnish composition to form an electrically insulative thermoset coating over the motor component.

Other features of the present invention will be apparent from the following more detailed description of exemplary embodiments.

DETAILED DESCRIPTION OF EXEMPLARY EMBODIMENTS

According to one exemplary embodiment of the invention, a composition is disclosed that comprises a blend of a unsaturated polyester resin or vinyl ester resin, a low intrinsic viscosity (IV) functionalized poly(phenylene ether), a reactive liquid monomer, which can participate in a free radical or chain reaction, and a compatibilizing agent, wherein the functionalized poly(phenylene ether) has at least one unsaturated group and an intrinsic viscosity of about 0.06 to about 0.25 deciliter per gram, specifically about 0.09 to 0.15 deciliter per gram, measured in chloroform at 25° C.

According to another exemplary embodiment, a composition comprises a blend of an unsaturated polyester resin or vinyl ester resin, a low intrinsic viscosity (IV) functionalized poly(phenylene ether), a reactive liquid monomer, and a compatibilizing agent, the functionalized poly(phenylene ether) having an intrinsic viscosity of about 0.06 deciliter per gram to about 0.25 deciliter per gram, measured in chloroform at 25° C. and a reactive liquid monomer, wherein the composition, when cured, has a glass transition temperature higher than about 75° C.

In another embodiment, a composition for electrically insulating a motor comprises a monofunctionalized or bifunctionalized poly(phenylene ether) having, respectively, one or two acryloyl or methacryloyl end groups and having an intrinsic viscosity in the range of about 0.06 deciliter per gram to about 0.25 deciliter per gram, measured in chloroform at 25° C., an unsaturated polyester resin or vinyl ester resin, and a reactive liquid monomer selected from the group consisting of vinyl toluene, styrene, alkyl styrenes, and combinations thereof, wherein the alkyl is a $C_1$-$C_4$ alkyl and can, optionally, be substituted with one or more halogens.

PPE (poly(phenylene ether)) and UPR (unsaturated polyester resin) or VER (vinyl ester resin) have been found to be individually soluble in vinyl toluene and other reactive liquid monomers. A mixture of the two polymers in reactive liquid monomer, however, can result in the formation of immiscible layers or phases. Phase separation can be particularly fast when using close to a 50:50 mixture by weight of the main polymers, PPE and UPR or VER. Although phase separation can occur at various ratios, it is especially fast when approaching a 50:50 weight polymer mixture as compared, for example, to a 95:5 or 5:95 weight polymer mixture of the main polymers.

It has now been found that improved varnish compositions containing a blend of PPE and UPR, or PPE and VER, can be obtained by the use of a compatibilizing agent employed to stabilize the polymer mixture before coating. In one embodiment, the compatibilizing agent is a block copolymer comprising acrylic and styrenic blocks, for example an acrylic block derived from acrylic or methacrylic ester monomers and a styrenic block derived from styrene monomer. For example, methacrylate blocks and styrene blocks have been found to be particularly effective. An additional block can be present, for example, derived from monomers of a conjugated diene such as butadiene. However, additional blocks are optional. Use of a compatibilizing agent allows a phase stable blend of PPE and UPR for at least about 24 hours at a temperature of 20° C., specifically up to three months or more at a temperature of 20° C. The blend remains phase stable at various temperatures by use of the compatibilizing agent, for example, also for at least about 24 hours at a temperature of 45° C., specifically up to three months or more at a temperature of 45° C. By "phase stable" is meant no visible macro segregation of the liquid into two separate phases.

In general, the compatibilizing agent is a block polymer comprising one block that is derived from an aromatic monomer, specifically a styrenic monomer which would be miscible with the PPE, and another block or chain that would be miscible with the UPE or VER, for example, derived from an acrylate, methacrylate, vinyl acetate, maleic anhydride monomers, or the like, or derived from monomers forming a polyester block such as poly(ethylene terephthalate), poly (butylene terephthalate), poly(tetramethylene terephthalate), and the like. In this case, the block copolymer is used to prevent phase separation between two polymers that are otherwise immiscible. The styrenic monomer forming a block of the compatibilizing agent can be, for example, a monomer represented by the following structure:

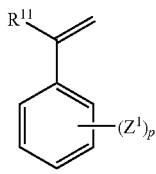

wherein $R^{11}$ is hydrogen, lower alkyl having from 1 to 7 carbon atoms, or halogen; $Z^1$ is halogen or lower alkyl having from 1 to 7 carbon atoms; and p is from 1 to 5.

In an exemplary embodiment, block copolymers for use as compatibilizing agents are commercially available from Arkema Inc. (Philadelphia) under the family trademark NANOSTRENGTH, in which relatively polar poly(methyl methacrylate) PMMA blocks are included with a styrene block and a butadiene block in the copolymers. NANOSTRENGTH copolymers consist of a polystyrene-block-poly (1,4-butadiene)-block-poly(methyl methacrylate), referred to as an SBM block copolymer. In some embodiments, the NANOSTRENGTH SBMs can be polymerized with an anionic technology that yields a highly syndiotactic structure for the PMMA block, that is, the monomer units of the PMMA block are oriented alternately dextro and levo. Illustrative species include the block copolymers available from Arkema and sold as NANOSTRENGTH E20, A012, A123, and A250. Such SBM block copolymers are also commercially available from Arkema under the family trademark CLEARSTRENGTH. Other block copolymers of styrene-polyolefin-methyl methacrylate that can be employed are available from Atofina, including AF-X223, AF-X333, AF-X012, AF-X342, AF-X004, and AF-X250. Other compatibilizing agents include low molecular weight block copolymers of styrene and maleic anhydride. They can comprise varying styrene to maleic anhydride mole ratios, for example, 1:1 to 4:1. They include partial monoesters. Such block copolymers are commercially available as SMA3840® from Sartomer Company (Exton, Pa.). Such block copolymers are known to the skilled artisan and can be in solid form.

In one embodiment, the present varnish composition comprises reactive liquid monomer in an amount of about 20 to about 70 weight percent of the composition and, within this range, specifically greater than or equal to 25 weight percent, more specifically greater than or equal to 30 weight percent, still more specifically greater than or equal to 35 weight percent, and still more specifically greater than or equal to 40 weight percent and, within this range, specifically less than or equal to 65 weight percent, more specifically less than or equal to 60 weight percent, and still more specifically less than or equal to 55 weight percent, and still more specifically less than or equal to 40 weight percent; functionalized poly (phenylene ether) in an amount of about 10 to 45 weight percent of the composition and, within this range, specifically greater than or equal to 15 weight percent, more specifically greater than or equal to 20 weight percent, and still more specifically greater than or equal to 25 weight percent and, within this range, specifically less than or equal to 40 weight percent, more specifically less than or equal to 35 weight percent, and still more specifically less than or equal to 30 weight percent; and compatibilizing agent in an amount of about 2 to 20 percent of the composition and, within this range, specifically greater than or equal to 5 weight percent, more specifically greater than or equal to 8 weight percent, and still more specifically greater than or equal to 10 weight percent and, within this range, specifically less than or equal to 17 weight percent, more specifically less than or equal to 15 weight percent, and still more specifically less than or equal to 12 weight percent, wherein these weight percents are based on the total weight of the composition.

Accordingly, the varnish composition can be "solventless" varnish in one embodiment. By solventless is meant that, when combined, the varnish composition can be cured such that the polymers and the reactive liquid monomer can react to form an electrically insulative thermoset. Solventless also means that the composition excludes solvents that are incapable of being copolymerized with the functionalized PPE and the UPR or VER.

The functionalized poly(phenylene ether) in the composition can be a poly(phenylene ether) (PPE) comprising at least one aliphatic carbon-carbon double bond or carbon-carbon triple bond. Functionalized poly(phenylene ether)s include capped poly(phenylene ether)s and ring-functionalized poly (phenylene ether)s. The functionalized poly(phenylene ether can be a functionalized homopolymer or copolymer in the present varnish compositions. The functionalized PPE can also be derived from PPE that contains moieties prepared by grafting vinyl monomers or polymers such as polystyrenes and elastomers, as well as coupled PPE in which coupling agents such as low molecular weight polycarbonates, quinones, heterocycles and formals undergo reaction in known manner with the hydroxy groups of two poly(phenylene ether) chains to produce a higher molecular weight polymer, provided a substantial proportion of free OH groups remains. In one exemplary embodiment, the PPE that is functionalized is a homopolymer.

When the functionalized poly(phenylene ether) is a capped poly(phenylene ether), at least one terminal hydroxyl group is terminated or "capped" with an end group containing aliphatic unsaturation to create functionalized PPE. The capped PPE may be either monofunctionalized or polyfunctionalized, for example, bifunctionalized, i.e. the capping can be at only one end or at both ends of the PPE chain or at a plurality of ends in a branched PPE. As mentioned above, the end caps can be any aliphatic unsaturated functional group, for example, acryloyl or methacryloyl groups.

In one embodiment, the capped poly(phenylene ether) is produced by capping a poly(phenylene ether) that is the polymerization product of at least one monohydric phenol having the structure:

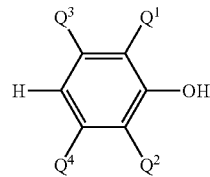

(I)

wherein each $Q^1$ and $Q^2$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Q^3$ and $Q^4$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. Suitable monohydric phenols include those described in U.S. Pat. No. 3,306,875 to Hay, and highly preferred monohydric phenols include 2,6-dimethylphenol and 2,3,6-trimethylphenol. The poly(phenylene ether) may be a copolymer of at least two monohydric phenols, such as 2,6-dimethylphenol and 2,3,6-trimethylphenol. More particularly, all of the above $C_1$-$C_{12}$ groups can be $C_1$-$C_7$ groups. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties.

In one embodiment, a capped poly(phenylene ether) comprises at least one capping group having the structure:

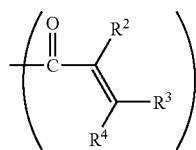

(II)

wherein $R^2$, $R^3$, and $R^4$ are each independently hydrogen, $C_1$-$C_{18}$ hydrocarbyl, $C_2$-$C_{18}$ hydrocarbyloxycarbonyl, nitrile, formyl, carboxylate, imidate, thiocarboxylate, or the like. In some embodiments, the capped poly(phenylene ether) comprises at least one acrylate ($R^2$=$R^3$=$R^4$=hydrogen) or methacrylate ($R^2$=methyl, $R^3$=$R^4$=hydrogen) capping group. It will be understood that the prefix "(meth)acryl-" includes both "acryl-" and "methacryl-". In one embodiment, the $C_1$-$C_{18}$ hydrocarbyl and $C_2$-$C_{18}$ hydrocarbyloxycarbonyl can have up to seven carbons.

In some embodiments, the capped poly(phenylene ether) comprises the residuum of a monohydric phenol, in which the capped poly(phenylene ether) may be a monocapped poly(phenylene ether) having the structure

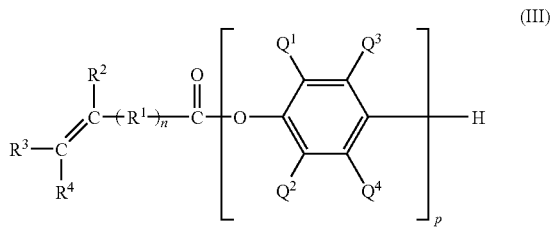

(III)

wherein each occurrence of $Q^1$, $Q^2$, $Q^3$ and $Q^4$ is as defined above; p is 1 to about 100, specifically 2 to about 30, more specifically 3 to about 20; $R^1$ is $C_1$-$C_{12}$ hydrocarbylene; n is 0 or 1; and $R^2$, $R^3$, and $R^4$ are each independently hydrogen or $C_1$-$C_{18}$ hydrocarbyl, wherein p can be a number such that the intrinsic viscosity of the PPE is about 0.06 deciliter per gram to about 0.25 deciliter per gram and can be about 0.09 deciliter per gram to about 0.15 deciliter per gram as measured in chloroform at 25° C.

In some embodiments, the capped poly(phenylene ether) is a monocapped poly(phenylene ether) having the structure:

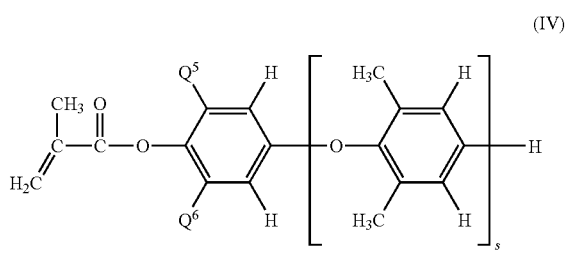

(IV)

wherein $Q^5$ and $Q^6$ are each independently methyl or di-n-butylaminomethyl; s is 1 to about 20, specifically 1 to about 15, more specifically 1 to about 10, still more specifically 1 to about 8.

In some embodiments, the capped poly(phenylene ether) comprises a reaction product of a monohydric, dihydric phenol, or monohydric and dihydric phenol, in which the capped poly(phenylene ether) can be a bicapped poly(phenylene ether) having the structure:

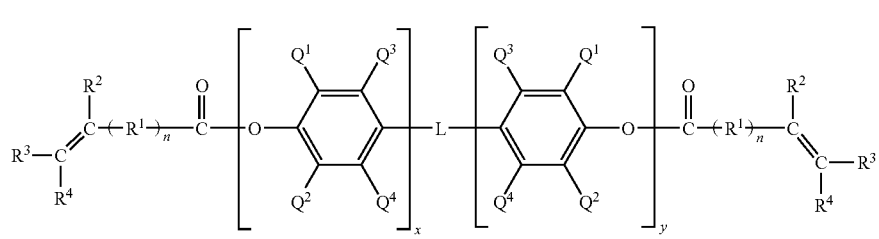

(V)

wherein each occurrence of $Q^1$, $Q^2$, $Q^3$ and $Q^4$ is as defined above; each occurrence of x and y is independently 0 to about 100 with the proviso that the sum of x and y is 2 to about 100; each occurrence of $R^1$ is independently $C_1$-$C_{12}$ hydrocarbylene; each occurrence of n is independently 0 or 1; each occurrence of $R^2$-$R^4$ is independently hydrogen or $C_1$-$C_{18}$ hydrocarbyl; and L has the structure:

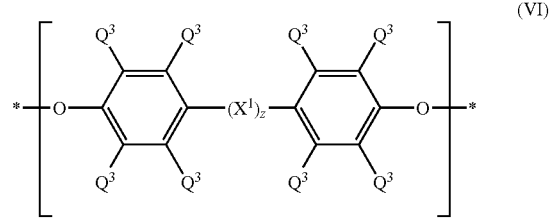

(VI)

wherein each occurrence of $Q^3$ is independently hydrogen, halogen, unsubstituted or substituted $C_1$-$C_{12}$ hydrocarbyl (with the proviso that the hydrocarbyl group is not tertiary hydrocarbyl), $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; z is 0 or 1; and $X^1$ has a structure selected from the group consisting of

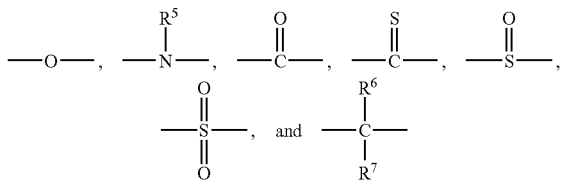

wherein each occurrence of $R^5$ is independently selected from the group consisting of hydrogen and $C_1$-$C_{12}$ hydrocarbyl and each occurrence of $R^6$ and $R^7$ is independently selected from the group consisting of hydrogen, $C_1$-$C_{12}$ hydrocarbyl, and $C_1$-$C_6$ hydrocarbylene wherein $R^6$ and $R^7$ can optionally collectively form a $C_4$-$C_{12}$ alkylene group.

The functionalized PPE for use in accordance with exemplary embodiments of the invention may be made by any suitable method of making capped PPE, including but not limited to the methods described in U.S. Pat. No. 6,897,282 and U.S. Pat. No. 7,329,708, which are hereby incorporated by reference in their entirety. For example, this process can begin with oxidative coupling of at least one monohydroxyaromatic compound such as 2,6-xylenol or 2,3,6-trimethylphenol by methods known in the art.

Catalyst systems are generally employed for such coupling and they typically contain at least one heavy metal compound such as a copper, manganese, or cobalt compound, usually in combination with various other materials. The polymerization is performed in a suitable solvent such as benzene or toluene by way of example only, for example, at a temperature about 20° C. to about 100° C. Thereafter, the catalyst is removed.

After removal of the catalyst, the PPE containing solution is concentrated to a higher solids level as part of the isolation of the PPE by removing the polymerization solvent. A suitable functionalizing agent, depending on the desired end group for the PPE, is added prior to and/or during the solvent removal, resulting in the capped PPE. For example, to make PPE having (meth)acryloyl end groups according to one embodiment of the invention, a suitable functionalizing agent is methacrylic anhydride. PPE is typically a solid at room temperature. It can be partially soluble in the reactive liquid monomer at room temperature.

In some embodiments, the functionalized poly(phenylene ether) is a bicapped poly(phenylene ether) having the structure:

wherein each occurrence of $Q^5$ and $Q^6$ is independently methyl or di-n-butylaminomethyl; each occurrence of x and y is independently 0 to about 100 with the proviso that the sum of x and y is 2 to about 100.

In some embodiments, the functionalized poly(phenylene ether) is a capped poly(phenylene ether) having the structure:

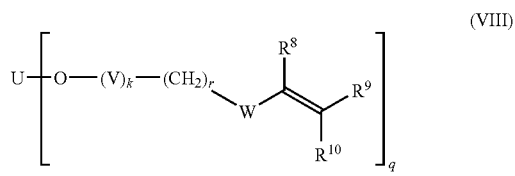

(VIII)

wherein U is a $C_6$-$C_{18}$ aryl group optionally substituted with one or more $C_1$-$C_6$ alkyl groups; V is a phenylene ether group; k is 1 to about 100; r is 1 to 6; W is a phenylene group or an oxygen atom; each occurrence of $R^8$, $R^9$, and $R^{10}$ is independently selected from the group consisting of hydrogen, $C_1$-$C_6$ alkyl, $C_2$-$C_6$ alkenyl, and $C_2$-$C_6$ alkynyl; and q is 1, 2, 3, or 4. Procedures for synthesizing capped poly(phenylene ether)s having this structure are described in U.S. Patent Application Publication No. US 2004/0146692 A1 of Inoue et al.

In another embodiment, the functionalized poly(phenylene ether) comprises a ring-functionalized poly(phenylene ether) comprising repeating structural units of the formula:

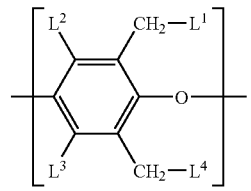

wherein each $L^1$-$L^4$ is independently hydrogen, a $C_1$-$C_{12}$ alkyl group, an alkenyl group, or an alkynyl group; wherein the alkenyl group is represented by

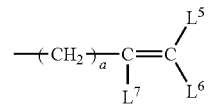

wherein $L^5$-$L^7$ are independently hydrogen or methyl, and a is 0, 1, 2, 3, or 4; wherein the alkynyl group is represented by

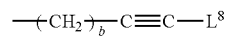

(VII)

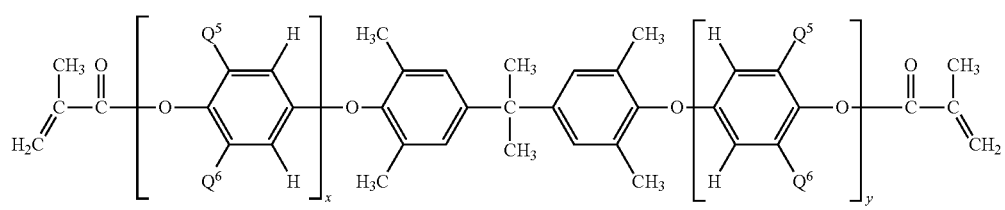

wherein $L^8$ is hydrogen, methyl, or ethyl, and b is 0, 1, 2, 3, or 4; and wherein about 0.02 mole percent to about 25 mole percent of the total $L^1$-$L^4$ substituents in the ring-functionalized poly(phenylene ether) are alkenyl and/or alkynyl groups. Within this range, it may be preferred to have at least about 0.1 mole percent, more preferably at least about 0.5 mole percent, alkenyl and/or alkynyl groups. Also within this range, it may be preferred to have up to about 15 mole percent, more preferably up to about 10 mole percent, alkenyl and/or alkynyl groups. The ring-functionalized poly(phenylene ether) of this embodiment may be prepared according to known methods. For example, an unfunctionalized poly(phenylene ether) such as poly(2,6-dimethyl-1,4-phenylene ether) may be metallized with a reagent such as n-butyl lithium and subsequently reacted with an alkenyl halide such as allyl bromide and/or an alkynyl halide such as propargyl bromide. This and other methods for preparation of ring-functionalized poly(phenylene ether) resins are described, for example, in U.S. Pat. No. 4,923,932 to Katayose et al.

In some embodiments, the ring-functionalized poly(phenylene ether) is the product of the melt reaction of a poly(phenylene ether) and an α,β-unsaturated carbonyl compound or a β-hydroxy carbonyl compound. Examples of α,β-unsaturated carbonyl compounds include, for example, maleic anhydride, citriconic anhydride, and the like. Examples of β-hydroxy carbonyl compounds include, for example, citric acid, and the like. Such functionalization is typically carried out by melt mixing the poly(phenylene ether) with the desired carbonyl compound at a temperature of about 190 to about 290° C.

The unsaturated polyester resin in the present composition is generally obtained by reaction of at least one polyhydric alcohol with at least one polybasic acid comprising an unsaturated polybasic acid. Specific examples of unsaturated polybasic acids that may be used to form the unsaturated polyester resin include maleic acid, fumaric acid, itaconic acid, citraconic acid, chloromaleic acid, dimeric methacrylic acid, nadic acid, tetrahydrophthalic acid, endo-methylenetetrahydrophthalic acid, hexachloro-endo-methylenetetrahydrophthalic acid, halogenated phthalic acids, and the like, as well as their corresponding esters and anhydrides. Preferred unsaturated acids include maleic acid, fumaric acid, and their esters and anhydrides.

Often, polyfunctional saturated and aromatic acids are employed in conjunction with the polybasic unsaturated acids to reduce the density of the ethylenic unsaturation and provide the desired chemical and mechanical properties to the coating. Examples of saturated and aromatic polybasic acids include succinic acid, adipic acid, sebacic acid, azelaic acid, dodecanedioic acid, eicoic acid, phthalic acid, isophthalic acid, terephthalic acid, and the like, as well as their esters and anhydrides. Preferred aromatic polybasic acids include phthalic acid, isophthalic acid, and their esters and anhydrides.

Examples of polyhydric alcohols include ethylene glycol, propylene glycol, diethylene glycol, dipropylene glycol, 1,2-butanediol, 1,3-butanediol, 1,4-butanediol, neopentyl glycol, glycerol, triethylene glycol, pentanediol, hexylene glycol, hydrogenated bisphenol A, bisphenol A-alkylene oxide adducts, tetrabromobisphenol A-alkylene oxide adducts, and the like. An exemplary polyhydric alcohol is propylene glycol.

In one embodiment, the unsaturated polyester is the reaction product of at least one polyhydric alcohol comprising propylene glycol; at least one unsaturated polybasic acid comprising maleic acid or maleic anhydride; and at least one aromatic polybasic acid comprising phthalic acid, phthalic anhydride, or isophthalic acid. Unsaturated polyester resins are commercially available, often as compositions further comprising an alkenyl aromatic monomer, and include, for example, the unsaturated polyester resins obtained from Ashland Chemical as Ashland Q6585 and MR14072, and from Alpha Owens Corning as AOC-XV2346. The unsaturated polyester resin obtained from Ashland as Q6585 is described by its manufacturer as "high-reactivity, thickenable, polyester resin for use in low profile and controlled shrink applications." The datasheet supplied with the material indicates a styrene content of 35 weight percent: Another unsaturated polyester resin is commercially available as 707C from Von Roll (Schenectady, N.Y.). The latter unsaturated polyester resin in vinyl toluene (without PPE) has been used for varnishes.

As an alternative to the unsaturated polyester, the curable varnish composition can comprise a vinyl ester resin. Whereas an unsaturated polyester resin has vinyl bonds randomly placed in the main chain, a vinyl ester resin has vinyl bonds at both chain ends. In particular, one example of a vinyl ester resin is commercially available from Dow (Michigan) as DERAKANE® M311-450. In one embodiment, the vinyl ester resin is a linear reaction product of bisphenol A and an epichlorohydrin epoxy that is terminated with an unsaturated acid such as methacrylic acid.

Another primary part of the varnish composition is a reactive liquid monomer in which the polymers in the composition are dissolved prior to application of the varnish. By "reactive liquid monomer" is meant any reactive monomer that is in liquid form and is curable with the main polymers (PPE and UPR) to form a thermoset. Exemplary solvents include vinyl toluene, styrene, t-butyl styrene, dibromostyrene, and combinations of those. Any suitable ratio of total main polymers to reactive liquid monomer may be used, although the ratio is typically between about 2:1 to about 1:5 by weight of UPR-plus-PPE:solvent, and may be about 1:1 by weight of UPR-plus-PPE:solvent. However, these ratios may be farther varied, for example, if any additives or crosslinking agents are added which may farther enhance varnish performance.

Varnish compositions according to exemplary embodiments have been discovered to form thermosets that have superior properties over those of prior-art varnishes, including a significantly higher glass transition temperature ($T_g$), which generally is at least about 70° C. and may range up to about 170° C. or higher. More typically, the $T_g$ is about 100° C. to about 165° C. As a result, the varnishes exhibit greater thermal stability over prior-art varnishes, such as varnishes containing unsaturated polyester resin alone as a main polymer.

There is no particular limitation on the method by which the composition is prepared. For example, the composition can be prepared by forming an intimate blend of the functionalized poly(phenylene ether), the alkenyl aromatic monomer, and the unsaturated polyester or vinyl ester. When the functionalized poly(phenylene ether) is a capped poly(phenylene ether), the composition can be prepared directly from an uncapped poly(phenylene ether) by dissolving the uncapped poly(phenylene ether) in a portion of the alkenyl aromatic monomer, adding a capping agent to form the capped poly(phenylene ether) in the presence of the alkenyl aromatic monomer, and adding the unsaturated polyester resin or vinyl ester resin, and any other components or additives to form the curable composition. Alternatively, the unsaturated polyester resin (UPR) or vinyl ester resin (VER) can be obtained in a varnish composition already containing reactive liquid monomer, in which case PPE and additional reactive liquid monomer plus crosslinking agent can be separately prepared in a pre-mixture and then mixed with the UPR or VER varnish composition. The compatibilizing agent can, for example, be dissolved in additional reactive liquid monomer and then mixed in with the combined PPE and UPR or VER, or can be added to the pre-mixture of PPE after the PPE is dissolved.

The varnish composition is generally applied to a generator or motor winding, such as a traction motor winding for a locomotive or off-highway vehicle, and cured. In an exemplary embodiment, the curing process results in a chemical reaction in which the monomer diluent chemically reacts with the PPE and UPR and together forms a thermoset varnish coating that protects the entire motor winding assembly. The curing may be self-initiating or may require initiation of the reaction between the PPE, UPR or VER, and the reactive liquid monomer through the use of a curing initiator, such as a catalyst.

The curing initiator can include any compound capable of producing free radicals at elevated temperatures. Such curing initiators may include both peroxy and non-peroxy based radical initiators. Examples of useful peroxy initiators include, for example, benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, alpha,alpha'-bis(t-butylperoxy-m-isopropyl)benzene, 2,5-dimethyl-2,5-di(t-butylperoxy)hexane, di(t-butylperoxy)isophthalate, t-butylperoxy benzoate, 2,2-bis(t-butylperoxy)butane, 2,2-bis(t-butylperoxy)octane, 2,5-dimethyl-2,5-di(benzoylperoxy)hexane, di(trimethylsilyl)peroxide, trimethylsilylphenyltriphenylsilyl peroxide, and the like, and mixtures thereof. Suitable non-peroxy initiators include, for example, 2,3-dimethyl-2,3-diphenylbutane, 2,3-trimethylsilyloxy-2,3-diphenylbutane, and the like, and mixtures thereof. The curing initiator may further include any compound capable of initiating anionic polymerization of the unsaturated components. Such anionic polymerization initiators include, for example, alkali metal amides such as sodium amide ($NaNH_2$) and lithium diethyl amide ($LiN(C_2H_5)_2$), alkali metal and ammonium salts of $C_1$-$C_{10}$ alkoxides, alkali metal hydroxides, ammonium hydroxides, alkali metal cyanides, organometallic compounds such as the alkyl lithium compound n-butyl lithium, Grignard reagents such as phenyl magnesium bromide, and the like, and combinations thereof. In one embodiment, the curing initiator is a peroxide, such as 2,5-bis-(t-butyl peroxy)-2,5-dimethyl-3-hexane or dicumyl peroxide or combinations thereof. The curing initiator may promote curing at a temperature in a range of about 0° C. to about 200° C. When employed, the curing initiator is typically used in an amount of about 0.005 to about 2 parts by weight per 100 parts by weight total of PPE, UPR or VER, and reactive liquid monomer.

There is no particular limitation on the method by which the composition may be cured. The composition may, for example, be cured thermally or by using irradiation techniques, including radio frequency heating, UV irradiation, and electron beam irradiation. For example, the composition may be cured by initiating chain-reaction curing with 10 seconds of radio frequency heating. When heat curing is used, the temperature selected may be about 80° to about 300° C., and the heating period may be about 5 seconds to about 24 hours. For example, if the curing initiator is dicumyl peroxide, the varnish may be cured for a time in the range of about 1 minute to about 10 hours at temperatures in the range of about 120° C. to about 200° C.

Curing may be conducted in multiple steps using different times and temperatures for each step. For example, curing may be staged to produce a partially cured and often tack-free resin, which then is fully cured by heating for longer periods or at higher temperatures. One skilled in the thermoset arts is capable of determining suitable curing conditions without undue experimentation. In some embodiments, the composition may be partially cured. However, references herein to properties of the "cured composition" or the "composition after curing" generally refer to compositions that are substantially fully cured. One skilled in the thermoset arts may determine whether a sample is substantially fully cured without undue experimentation. For example, one may analyze the sample by differential scanning calorimetry to look for an exotherm indicative of additional curing occurring during the analysis. A sample that is substantially fully cured will exhibit little or no exotherm in such an analysis.

The varnish composition can be applied and cured according to any suitable technique. One example of such a method is the vacuum pressure impregnation method, in which an entire motor winding assembly is placed in a pressure vessel under a high vacuum that draws out entrapped air and other gases. The varnish is introduced to the pressure vessel and the entire tank is pressurized, typically to at least 0.62 megaPascal (90 pounds per square inch) or higher to achieve a total penetration of the winding. The assembly may be baked at elevated temperatures to cure the varnish composition, i.e. to cause the main polymers, the reactive liquid monomer, and any additives to form a thermoset, producing a solid, sealed insulation system substantially impervious to moisture. Other suitable coating and curing techniques include dip coat and trickle treat, by way of example only.

Although compositions according to exemplary embodiments of the invention provide excellent properties, particularly when compared to current unsaturated polyester resin varnishes, it may still be desirable to introduce additives to the varnish composition prior to curing to even further enhance various properties. For example, a crosslinking agent may be added to even further enhance ductility and thermal stability, particularly in embodiments in which the PPE is monofunctionalized or in which the PPE has a relatively low intrinsic viscosity. A crosslinking agent is defined as a compound comprising at least two polymerizable groups selected from carbon-carbon double bonds, carbon-carbon triple bonds, and combinations thereof. Specifically, in the case of capped poly(phenylene ether), the crosslinking agent has functional groups that are same as the PPE end caps. For example, where the end caps are methacrylate groups, particularly suitable crosslinking agents include methacrylate-grafted polybutadiene, trimethylolpropane triacrylate (TMPTA), ethoxylated bisphenol A dimethacrylate, and combinations thereof.

Other suitable crosslinking agents include, for example, divinylbenzenes, diallylbenzenes, trivinylbenzenes, triallylbenzenes, divinyl phthalates, diallyl phthalates, triallyl mesate, triallyl mesitate, triallyl cyanurate, triallyl isocyanurate, trimethylolpropane tri(meth)acrylate, 1,6-hexanediol di(meth)acrylate, neopentyl glycol di(meth)acrylate, dipropylene glycol di(meth)acrylate, ethylene glycol di(meth)acrylate, propylene glycol di(meth)acrylate, cyclohexanedimethanol di(meth)acrylate, butanediol di(meth)acrylate, diethylene glycol di(meth)acrylate, triethylene glycol di(meth)acrylate, (ethoxylated)$_{2-40}$ 1,6-hexanediol di(meth)acrylates, (propoxylated)$_{2-40}$ 1,6-hexanediol di(meth)acrylates, (ethoxylated)$_{2-40}$ 1,4-butanediol di(meth)acrylates, (propoxylated)$_{2-40}$ 1,4-butanediol di(meth)acrylates, (ethoxylated)$_{2-40}$ 1,3-butanediol di(meth)acrylates, (propoxylated)$_{2-40}$ 1,3-butanediol di(meth)acrylates, (ethoxylated)$_{2-40}$ ethylene glycol di(meth)acrylates, (propoxylated)$_{2-40}$ ethylene glycol di(meth)acrylates, (ethoxylated)$_{2-40}$ propylene glycol di(meth)acrylates, (propoxylated)$_{2-40}$ propylene glycol di(meth)acrylates, (ethoxylated)$_{2-40}$ 1,4-cyclohexanedimethanol di(meth)acrylates, (propoxylated)$_{2-40}$ 1,4-cyclohexanedimethanol di(meth)acrylates, (ethoxylated)$_{2-40}$ bisphenol-A di(meth)acrylates, (propoxylated)$_{2-40}$ bisphenol-A di(meth)acrylates, (ethoxylated)$_{3-60}$ glycerol tri(meth)acrylates, (propoxylated)$_{3-60}$ glycerol tri(meth)acrylates, (ethoxylated)$_{3-60}$ trimethylolpropane tri(meth)acrylates, (propoxylated)$_{3-60}$ trimethylolpropane tri(meth)acrylates, (ethoxylated)$_{3-60}$ isocyanurate tri(meth)acrylates, (propoxylated)$_{3-60}$ isocyanurate tri(meth)acrylates, (ethoxylated)$_{4-80}$ pentaerythritol tetra(meth)acrylates, (propoxylated)$_{4-80}$ pentaerythritol tetra(meth)acrylates, (ethoxylated)$_{6-120}$ dipentaerythritol tetra(meth)acrylates, (propoxylated)$_{6-120}$ dipentaerythritol tetra(meth)acrylates, and the like, and mixtures thereof.

When present, the crosslinking agent may be used in an amount of about 1 to about 30 parts by weight, based on 100 parts by weight in total of the PPE, UPR (or VER), and reactive liquid monomer. Within this range, the crosslinker can be present in an amount specifically up to 25 parts by weight, more specifically up to 20 parts by weight and, within this range, specifically greater than or equal to 5 parts by weight, more specifically greater than or equal to 10 parts by weight, and still more specifically greater than or equal to 15 parts by weight.

Additives may include curing inhibitors and/or stabilizers that may increase shelf life of the varnish compositions. Suitable curing inhibitors include, for example, diazoaminobenzene, phenylacetylene, sym-trinitrobenzene, p-benzoquinone, acetaldehyde, aniline condensates, N,N'-dibutyl-o-phenylenediamine, N-butyl-p-aminophenol, 2,4,6-triphenylphenoxyl, pyrogallol, catechol, hydroquinone, monoalkylhydroquinones, p-methoxyphenol, t-butylhydroquinone, $C_1$-$C_6$-alkyl-substituted catechols (such as 4 tert-butylcatechol), dialkylhydroquinone, 2,4,6-dichloronitrophenol, halogen-ortho-nitrophenols, alkoxyhydroquinones, mono- and di- and polysulfides of phenols and catechols, thiols, oximes and hydrazones of quinone, phenothiazine, dialkylhydroxylamines, and the like, and combinations thereof. Suitable curing inhibitors further include poly(phenylene ether)s having free hydroxyl groups. When present, the curing inhibitor amount may be about 0.001 to about 10 parts by weight per 100 parts by weight of the total composition. If added, the curing inhibitors may be in combination with or in lieu of curing initiators.

The composition may, optionally, further comprise one or more additives such as, for example, dyes, pigments, colorants, antioxidants, heat stabilizers, light stabilizers, plasticizers, lubricants, flow modifiers, drip retardants, flame retardants, antiblocking agents, antistatic agents, flow-promoting agents, processing aids, substrate adhesion agents, mold release agents, toughening agents, low-profile additives, stress-relief additives, and combinations thereof. It is desirable that certain thermoplastics commonly referred to as "low profile additives" (LPAs) are absent from the composition. During curing, an LPA is rejected from the cured matrix and isolated as solid domains, typically less than about 5 micrometers in size, which distinct LPA domains dispersed in the cured matrix act as strain relief sites. Accordingly, the absence of LPAs in the composition can prevent weak points for dielectric breakthrough.

As indicated above, the varnish composition is particularly useful as an electrically insulative coating for motors and generators, such as traction motors for locomotives and off-highway vehicles (OHV). This is because varnish compositions according to exemplary embodiments can exhibit improved resistance to thermal cycling. The composition is also more ductile, exhibiting a higher elongation to break than prior-art varnish compositions.

While current UPR varnish compositions generally have relatively low ductility, with an elongation to break of about 1% or less, exemplary embodiments of the invention generally have high ductility and may have an elongation to break greater than about 2%, and may be greater than about 2.5%, and may even be greater than about 3%.

Resistance to thermal cycling may conveniently be measured by a nut cracking test. In the nut cracking test, a half inch hex nut is placed in the center of an aluminum pan having a diameter of 2 inches. A sample is made by pouring 12 grams of varnish composition onto the nut in the aluminum pan and then degassing under vacuum for approximately 15 minutes. The sample is then cured. After curing and initial inspection, the sample is placed into an ice water bath (0° C.) for 30 minutes. After 30 minutes, the sample is removed, inspected for cracking, and placed immediately into a 180° C. oven for 30 minutes. It is then removed, inspected and returned immediately into the ice water. This cycle is repeated 5 times at these temperatures. If the sample passes these cycles without cracking, it generally indicates that the composition has sufficient ductility and resistance to thermal cycling for varnish applications. Compositions that crack during the cycles fail the test and are generally not suitable for varnish applications.

Another advantage is that varnish compositions according to exemplary embodiments of the invention have reduced moisture uptake compared to varnish compositions having unsaturated polyester resin alone as a primary polymer.

Exemplary embodiments of the composition, when cured, can exhibit improved thermal stability above 180° C., including significant improvement in less weight loss after aging for 100 hours at 215° C. Other advantageous properties include hydrolytic stability and less cracking or chipping. Improved mechanical or electrical properties can also be obtained, namely low dielectric constant and dissipation factor, dimensional stability, and chemical resistance, especially to acid or base. The resulting balance of properties is an improvement compared to the use of unsaturated polyester resin alone. Consequently, the present varnish can significantly extend the life of traction motors and the like.

The invention includes at least the following embodiments:

Embodiment 1

A curable composition comprising a functionalized poly (phenylene ether) having at least one aliphatic unsaturated group and exhibiting an intrinsic viscosity of about 0.06 deciliter per gram to about 0.25 deciliter per gram, measured in chloroform at 25° C.; an unsaturated polyester resin or vinyl ester resin; a reactive liquid monomer; and a compatibilizing agent.

Embodiment 2

The curable composition of embodiment 1, wherein the curable composition is remains phase stable for at least 24 hours at a temperature of 20° C.

Embodiment 3

The curable composition of embodiment 1 or 2, wherein the functionalized poly(phenylene ether) is a poly(phenylene ether) terminally capped with a group containing aliphatic unsaturation, a bifunctionalized capped poly(phenylene ether) having two methacryloyl end groups, a capped poly (phenylene ether) having the structure (III) above, a capped poly(phenylene ether) having the structure (IV) above, a capped poly(phenylene ether) having the structure (V) and (VI) above, or a capped poly(phenylene ether) having the structure (VIII) above.

Embodiment 4

The curable composition of any of embodiments 1-3, wherein the compatibilizing agent is a block copolymer comprising a block derived from an aromatic monomer that is miscible with the functionalized poly(phenylene ether) and a block derived from a monomer that is miscible with the unsaturated polyester resin or vinyl ester resin.

Embodiment 5

The curable composition of any of embodiments 1-4, wherein the compatibilizing agent is a block copolymer comprising an acrylic or maleic anhydride block and a styrenic block.

Embodiment 6

The curable composition of any of embodiments 1-5, wherein the compatibilizing agent is a block copolymer comprising an acrylic block derived from methacrylic ester monomers and a styrenic block derived from styrene monomer, each of said acrylic block and styrenic block located at an end of the copolymer.

Embodiment 7

The curable composition of any of embodiments 1-6, wherein the compatibilizing agent comprises a polystyrene-block-poly(1,4-butadiene)-block-poly(methyl methacrylate) copolymer.

Embodiment 8

The curable composition of any of embodiments 1-7 comprising an unsaturated polyester resin obtained by reaction of at least one polyhydric alcohol with at least one polybasic acid comprising an unsaturated polybasic acid, wherein the unsaturated polybasic acid is selected from the group consisting of maleic acid, fumaric acid, itaconic acid, citraconic acid, chloromaleic acid, dimeric methacrylic acid, nadic acid, tetrahydrophthalic acid, endo-methylenetetrahydrophthalic acid, hexachloro-endo-methylenetetrahydrophthalic acid, halogenated phthalic acids, and their corresponding esters and anhydrides.

Embodiment 9

The curable composition of any of embodiments 1-8, wherein the reactive liquid monomer is selected from the group consisting of vinyl toluene, styrene, t-butyl styrenes, dibromostyrenes, and combinations thereof.

Embodiment 10

The curable composition of any of embodiments 1-9, wherein the functionalized poly(phenylene ether) has an intrinsic viscosity of about 0.09 to about 0.25 deciliter per gram as measured at 25° C. in chloroform.

Embodiment 11

The curable composition of any of embodiments 1-10 comprising a vinyl ester resin based on the reaction product of a bisphenol, an epoxy, and a monocarboxylic acid.

Embodiment 12

The curable composition of any of embodiments 1-11 further comprising a crosslinking agent.

Embodiment 13

The curable composition of any of embodiments 1-12 further comprising a crosslinking agent, wherein the ratio of the total amount of functionalized poly(phenylene ether) and unsaturated polyester resin or vinyl ester resin to the reactive liquid monomer is about 2:1 to about 1:5 by weight.

Embodiment 14

The curable composition of any of embodiments 1-13 wherein a thermoset formed by the curable composition has a glass transition temperature of about 100° C. to about 165° C.

Embodiment 15

A method for electrically insulating a motor using a varnish composition comprising applying a varnish composition according to any of embodiments 1-14 to a motor component; and curing the varnish composition to form an electrically insulative thermoset coating over the motor component.

The following examples are presentation by way of illustration only and not by way of limitation.

EXAMPLE 1

This is a theoretical example. The method described in U.S. Pat. No. 6,897,282 is used to make a methacrylate capped PPE compound illustrated in Formula II having an intrinsic viscosity of 0.06 dl/g. The PPE along with a dimethacrylate crosslinking agent and compatibilizing agent is then added to vinyl toluene in the amount of 40 percent by weight of the composition, along with 60 weight percent UPR to form a varnish composition. The crosslinking agent is SR348 (an ethoxylated bisphenol A dimethacrylate commercially available from Sartomer of Exton, Pa.), added in a weight ratio of 6:4:1 of PPE-plus-UPR/vinyl toluene/SR348. The compatibilizing agent is NANOSTRENGTH A250 SMB block copolymer consisting of a polystyrene-block-poly(1,4-butadiene)-block-poly(methyl methacrylate), added in a weight ratio of 6:4:2 of PPE-plus-UPR/vinyl toluene/compatibilizing agent. Then, 2% by weight of 2,5-bis-(t-butyl peroxy)-2,5-dimethyl-3-hexane (commercially available as TRIGONOX 101 from Akzo Nobel Polymer Chemicals of Chicago, Ill.) is added as the curing initiator. The varnish is degassed under vacuum and then cured to a thermoset at 110° C. for 2 hours, then at 150° C. for 30 minutes in a preheated convection oven.

EXAMPLE 2

A series of formulations A through F in Table 1 were prepared by blending methacrylate functional PPE (IV 0.09, available from SABIC Innovative Plastics, Inc., Selkirk, N.Y.), vinyl toluene (VT), a catalyzed unsaturated polyester solution in vinyl toluene (Von Roll 707C® available from Von Roll, Inc., Schenectady, N.Y.), and dicumyl peroxide (DCP) cure catalyst. Portions of these formulations were then degassed and cured at 160° C. for 2 hours followed by 180° C. for 1 hour. The remaining portions of formulations B, C, D, and E were found to phase separate on standing at room temperature.

TABLE 1

| Component | Formulation | | | | | |
|---|---|---|---|---|---|---|
| (wt. %) | A | B | C | D | E | F |
| Polyester | 100 | 70.58 | 66.66 | 33.34 | 25.0 | |
| PPE | | 11.78 | 16.67 | 33.34 | 37.5 | 50.0 |
| Vinyl Toluene | | 17.64 | 16.67 | 33.33 | 37.5 | 50.0 |
| DCP | | 0.44 | 0.50 | 1.00 | 1.13 | 1.50 |

Dynamic mechanical testing (DMA) according to ASTM D7028-07 was done on samples with the following dimensions: 2.5"×0.5"×0.125" (6.4 cm×1.3 cm×0.32 cm). The $T_g$ from this analysis is listed below. Thermal gravimetric analysis was also carried out in air up to 1000° C. The points at which significant thermal decomposition started to occur is shown as the temperatures where 5% and 10% of the initial weight was lost. Table 2 includes a summary of the results.

TABLE 2

| Formulation | $T_g$ (° C.) | Temp (° C.) at 5% Loss | Temp (° C.) at 10% Loss |
|---|---|---|---|
| A | 108 | 339 | 386 |
| B | 80 | 324 | 378 |
| C | 84 | 363 | 399 |
| D | 132 | 368 | 406 |
| E | 130 | 363 | 408 |
| F | 176 | 383 | 423 |

A formulation was prepared the same as D above except that 333 mg of SBM block copolymer compatibilizer, NanoStrength® E20 (available from Arkema) was added to act as a compatibilizing agent. Also, 33 mg of t-butyl catechol was added as a stabilizer. This formulation (G) did not phase separate at room temperature. A cured portion of this material exhibited a $T_g$ of 130° C.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method for electrically insulating a motor using a varnish composition comprising:

applying a varnish composition to a motor component; wherein the varnish composition comprises about 10 to about 45 weight percent of a functionalized poly(phenylene ether) having at least one aliphatic unsaturated group and exhibiting an intrinsic viscosity of about 0.06 deciliter per gram to about 0.25 deciliter per gram, measured in chloroform at 25° C.;

an unsaturated polyester resin or vinyl ester resin;

about 20 to about 70 weight percent of a reactive liquid monomer; and about 2 to about 20 weight percent of a compatibilizing agent; wherein the compatibilizing agent is a block copolymer comprising a block derived from an aromatic monomer that is miscible with the functionalized poly(phenylene ether) and a block derived from a monomer that is miscible with the unsaturated polyester resin or vinyl ester resin;

wherein the ratio of the total amount of functionalized poly(phenylene ether) and unsaturated polyester resin or vinyl ester resin to the reactive liquid monomer is about 2:1 to about 1:5 by weight; and curing the varnish composition to form an electrically insulative thermoset coating over the motor component.

2. The method of claim 1, wherein the varnish composition comprises a curable composition comprising:

10 to 45 weight percent of functionalized poly(phenylene ether) having the structural formula:

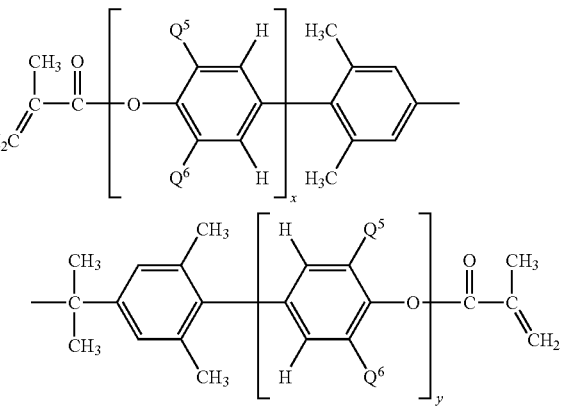

wherein each occurrence of $Q^5$ and $Q^6$ is independently methyl or di-n-butylaminomethyl and each occurrence of x and y is independently 0 to about 100 with the proviso that the sum of x and y is 2 to about 100;

30 to 50 weight percent of unsaturated polyester resin;

2 to 20 weight percent of polystyrene-block-poly(1,4-butadiene)-block-poly(methyl methacrylate)-block structure copolymer;

20 to 70 weight percent of reactive liquid monomer selected from the group consisting of vinyl toluene, styrene, t-butyl styrene, dibromostyrene, and combinations thereof; and 1 to 30 weight percent of the total composition of a multifunctional acrylate crosslinking agent.

3. The method of claim 1, wherein the varnish composition is phase stable for at least 24 hours at a temperature of 20° C.

4. The method of claim 1, wherein the functionalized poly (phenylene ether) is a poly(phenylene ether) terminally capped with a group containing aliphatic unsaturation.

5. The method of claim 1, wherein the functionalized poly (phenylene ether) is a bifunctionalized capped poly(phenylene ether) having two methacryloyl end groups.

6. The method of claim 1, wherein the functionalized poly (phenylene ether) is a capped poly(phenylene ether) having the structure:

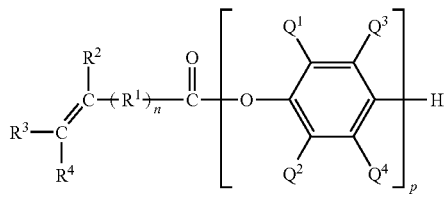

wherein each occurrence of $Q^1$ and $Q^2$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $Q^3$ and $Q^4$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; p is 1 to about 100; $R^1$ is $C_1$-$C_{12}$ hydrocarbylene; n is 0 or 1; and $R^2$ and $R^3$ and $R^4$ are each independently hydrogen or $C_1$-$C_{18}$ hydrocarbyl.

7. The method of claim 1, wherein the functionalized poly (phenylene ether) is a capped poly(phenylene ether) having the structure:

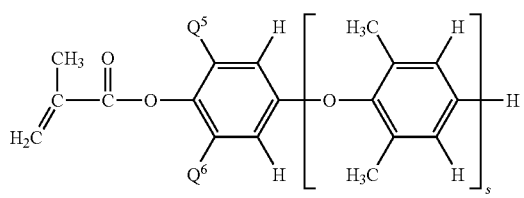

wherein $Q^5$ and $Q^6$ are each independently methyl or di-n-butylaminomethyl; and s is 1 to about 20.

8. The method of claim 1, wherein the functionalized poly (phenylene ether) is a capped poly(phenylene ether) having the structure:

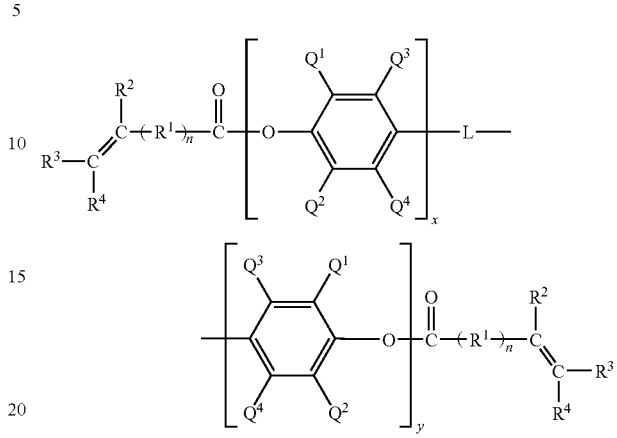

wherein each occurrence of $Q^1$ and $Q^2$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $Q^3$ and $Q^4$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of x and y is independently 0 to about 100 with the proviso that the sum of x and y is 2 to about 100; each occurrence of $R^1$ is independently $C_1$-$C_{12}$ hydrocarbylene; each occurrence of n is independently 0 or 1; each occurrence of $R^2$-$R^4$ is independently hydrogen or $C_1$-$C_{18}$ hydrocarbyl; and L has the structure:

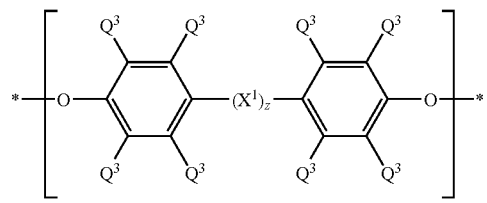

wherein each occurrence of $Q^3$ is, as defined above, independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; z is 0 or 1; and $X^1$ has a structure selected from the group consisting of

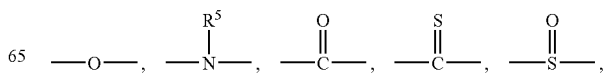

-continued

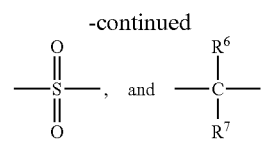

wherein each occurrence of $R^5$ is independently selected from the group consisting of hydrogen and $C_1$-$C_{12}$ hydrocarbyl and each occurrence of $R^6$ and $R^7$ is independently selected from the group consisting of hydrogen, $C_1$-$C_{12}$ hydrocarbyl, and $C_1$-$C_6$ hydrocarbylene wherein $R^6$ and $R^7$ can optionally collectively form a $C_4$-$C_{12}$ alkylene.

9. The method of claim 1, wherein the functionalized poly(phenylene ether) is a capped poly(phenylene ether) having the structure

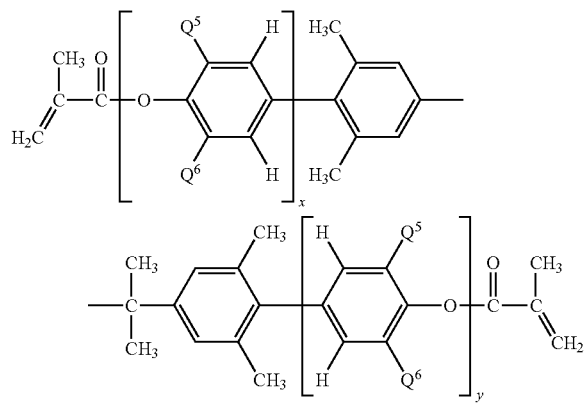

wherein each occurrence of $Q^5$ and $Q^6$ is independently methyl or di-n-butylaminomethyl; and each occurrence of x and y is independently 0 to about 100 with the proviso that the sum of x and y is 2 to about 100.

10. The method of claim 1, wherein the compatibilizing agent is a block copolymer comprising an acrylic or maleic anhydride block and a styrenic block.

11. The method of claim 10, wherein the compatibilizing agent is a block copolymer comprising an acrylic block derived from methacrylic ester monomers and a styrenic block derived from styrene monomer, each of said acrylic block and styrenic block located at an end of the copolymer.

12. The method of claim 10, wherein the compatibilizing agent comprises a polystyrene-block-poly(1,4-butadiene)-block-poly(methyl methacrylate) copolymer.

13. The method of claim 1, wherein the varnish composition comprises an unsaturated polyester resin obtained by reaction of at least one polyhydric alcohol with at least one polybasic acid comprising an unsaturated polybasic acid, wherein the unsaturated polybasic acid is selected from the group consisting of maleic acid, fumaric acid, itaconic acid, citraconic acid, chloromaleic acid, dimeric methacrylic acid, nadic acid, tetrahydrophthalic acid, endo-methylenetetrahydrophthalic acid, hexachloro-endo-methylenetetrahydrophthalic acid, halogenated phthalic acids, and their corresponding esters and anhydrides.

14. The method of claim 13, wherein the unsaturated polyester resin further comprises the repeat units derived from one or more of succinic acid, adipic acid, sebacic acid, azelaic acid, dodecanedioic acid, eicoic acid, phthalic acid, isophthalic acid, terephthalic acid, and their esters and anhydrides.

15. The method of claim 13, wherein the polyhydric alcohol is selected from the group consisting of ethylene glycol, propylene glycol, diethylene glycol, dipropylene glycol, 1,2-butanediol, 1,3-butanediol, 1,4-butanediol, neopentyl glycol, glycerol, triethylene glycol, pentanediol, hexylene glycol, bisphenol A, hydrogenated bisphenol A, bisphenol A-alkylene oxide adducts, and tetrabromobisphenol alkylene oxide adducts.

16. The method of claim 1, wherein the reactive liquid monomer is selected from the group consisting of vinyl toluene, styrene, t-butyl styrenes, dibromostyrenes, and combinations thereof.

17. The method of claim 1, wherein the functionalized poly(phenylene ether) has an intrinsic viscosity of about 0.09 to about 0.25 deciliter per gram as measured at 25° C. in chloroform.

18. The method of claim 1 comprising a vinyl ester resin based on the reaction product of a bisphenol, an epoxy, and a monocarboxylic acid.

19. The method of claim 1, wherein the varnish composition further comprising a crosslinking agent selected from the group consisting of divinylbenzenes, diallylbenzenes, trivinylbenzenes, triallylbenzenes, divinyl phthalates, diallyl phthalates, triallyl mesate, triallyl mesitate, triallyl cyanurate, triallyl isocyanurate, trimethylolpropane tri(meth)acrylate, 1,6-hexanedioldi(meth)acrylate, neopentyl glycol di(meth)acrylate, dipropylene glycol di(meth)acrylate, ethylene glycol di(meth)acrylate, propylene glycol di(meth)acrylate, cyclohexanedimethanol di(meth)acrylate, butanedioldi(meth)acrylate, diethylene glycol di(meth)acrylate, triethylene glycol di(meth)acrylate, methacryloxypropyl trimethoxysilane, bisphenol A dimethacrylate, (ethoxylated)$_{1-20}$ nonylphenol(meth)acrylates, (propoxylated)$_{1-20}$ nonylphenol (meth)acrylates, (ethoxylated)$_{2-40}$ 1,6-hexanediol di(meth)acrylates, (propoxylated)$_{2-40}$ 1,6-hexanediol di(meth)acrylates, (ethoxylated)$_{2-40}$ 1,4-butanediol di(meth)acrylates, (propoxylated)$_{2-40}$ 1,4-butanedioldi(meth)acrylates, (ethoxylated)$_{2-40}$ 1,3-butanediol di(meth)acrylates, (propoxylated)$_{2-40}$ 1,3-butanediol di(meth)acrylates, (ethoxylated)$_{2-40}$ ethylene glycol di(meth)acrylates, (propoxylated)$_{2-40}$ ethylene glycol di(meth)acrylates, (ethoxylated)$_{2-40}$ propylene glycol di(meth)acrylates, (propoxylated)$_{2-40}$ propylene glycol di(meth)acrylates, (ethoxylated)$_{2-40}$ 1,4-cyclohexanedimethanol di(meth)acrylates, (propoxylated)$_{2-40}$ 1,4-cyclohexanedimethanol di(meth) acrylates, (ethoxylated)$_{2-40}$ bisphenol-A di(meth)acrylates, (propoxylated)$_{2-40}$ bisphenol-A di(meth)acrylates, (ethoxylated)$_{3-60}$ glycerol tri(meth)acrylates, (propoxylated)$_{3-60}$ glycerol tri(meth)acrylates, (ethoxylated)$_{3-60}$ trimethylolpropane tri(meth)acrylates, (propoxylated)$_{3-60}$ trimethylolpropane tri(meth)acrylates, (ethoxylated)$_{3-60}$ isocyanurate tri(meth)acrylates, (propoxylated)$_{3-60}$ isocyanurate tri(meth) acrylates, (ethoxylated)$_{4-80}$ pentaerythritol tetra(meth)acrylates, (propoxylated)$_{4-80}$ pentaerythritol tetra(meth) acrylates, (ethoxylated)$_{6-120}$ dipentaerythritol tetra(meth) acrylates, (propoxylated)$_{6-120}$ dipentaerythritol tetra(meth) acrylates, and mixtures thereof.

20. The method of claim 1, wherein a thermoset formed by the varnish composition has a glass transition temperature of about 100° C. to about 165° C.

21. The method of claim 1, wherein the reactive liquid monomer is vinyl toluene and the varnish composition further comprises ethoxylated bisphenol A dimethacrylate as a crosslinking agent.

* * * * *